United States Patent [19]

Teramachi

[11] 4,348,064
[45] Sep. 7, 1982

[54] LINEAR BALL BEARING UNIT

[76] Inventor: Hiroshi Teramachi, 2-34-8, Higashi-Tamagawa Setagaya-ku, Tokyo, Japan, 158

[21] Appl. No.: 189,903

[22] Filed: Sep. 22, 1980

[30] Foreign Application Priority Data

Oct. 20, 1979 [JP] Japan .............................. 54/135580

[51] Int. Cl.³ .............................................. F16C 29/06
[52] U.S. Cl. .................................... 308/6 C; 308/6 R
[58] Field of Search .............. 308/6 C, 6 B, 6 R, 6 A, 308/3 R, 3 A

[56] References Cited

U.S. PATENT DOCUMENTS

| 4,040,679 | 8/1977 | Teramachi | 308/6 C |
| 4,240,673 | 12/1980 | Ernst et al. | 308/6 C |
| 4,253,709 | 3/1981 | Teramachi | 308/6 C |

OTHER PUBLICATIONS

"THK Linear Bearings", Catalogue No. 9E.

Primary Examiner—Lenard A. Footland
Attorney, Agent, or Firm—George B. Oujevolk

[57] ABSTRACT

A linear ball bearing arrangement has an elongated track table over which is disposed a linear ball bearing main body, of which the front and rear end surfaces have side caps. Also, four concave axial track grooves are formed axially in the main body in parallel. Corresponding axial track grooves are defined in the track table. Non-loaded bearing ball paths are disposed adjacent to the four axial grooves. The combination of the four concave track grooves in the main body and the corresponding track grooves in the track table form the loaded ball paths while the end side caps connect the loaded ball paths to the non-loaded ball paths. The loaded ball paths and the non-loaded ball paths are symmetrically disposed around the center axis of the track table and the main body.

2 Claims, 14 Drawing Figures

LINEAR BALL BEARING UNIT

BACKGROUND OF THE INVENTION

Field of the Invention

This invention relates to a guide for performing a linear machine movement, and more particularly to an improvement in a linear ball bearing unit in which a resistance against the movement is decreased by rolling friction, i.e., the usual holder cage is eliminated by forming clearances in a slide surface such as a table or the saddle of an industrial machine. A bearing main body capable of supporting a carriage device which can be reciprocated using track grooves of the track is used so that a bearing characteristic may be kept.

BRIEF REVIEW OF THE PRIOR ART

Since a conventional type of a linear bearing uses ball bearings, it may support a vertical load, but can support only a part of the momentum load or an upward load.

This applicant has developed a linear ball bearing in order to overcome the above mentioned disadvantages by arranging the ball rows at the right and left portions of the bearing main body, and by providing side caps having ball direction changing U-shaped grooves corresponding to the rows of balls at the end surfaces of said bearing main body.

To the contrary, in the case of a linear ball bearing, a holder cage should be made in proportion to a varied length of the bearing main body, which causes some difficulty in decreasing the manufacturing cost of this type of bearing due to the many different kinds and the small volumes of manufacturing.

In order to replace the holder cage, the track grooves in the bearing main body and the track table for the load balls should be made narrow.

SUMMARY OF THE INVENTION

Generally speaking the present invention contemplates a linear ball bearing arrangement consisting of an elongated track table over which is disposed a linear ball bearing main body which has side caps on the front and rear ends. Four concave axial track grooves are formed axially in the main body parallel to each other. Corresponding axial track grooves are defined in the track table. Non-loaded bearing ball paths are disposed adjecent to the four axial grooves. The combination of the four concave track grooves in the main body and the corresponding track grooves in the track table form the loaded ball paths while the end side caps connect the loaded ball paths to the non-loaded ball paths. The loaded ball paths and the non-loaded ball paths are symmetrically disposed around the center axis of the track table and the main body.

OBJECTS OF THE INVENTION

It is an object of the present invention to provide a linear bearing unit which does not show any poor bearing characteristics even if the holder cage is eliminated, i.e. a contact point groove is kept at a specified position by forming clearances in the bearing main body and the track grooves of the track table, resulting in showing the parallel contact angles of the two opposing load balls, no edge load applied to the track grooves, and further a pre-pressure may be applied to the load balls in the four rows of grooves.

It is another object of the present invention to provide a linear bearing unit in which the side caps to be fitted to both end surfaces of the bearing main body are formed with the annular concave grooves corresponding to annular projections formed at the end surfaces of the bearing main body, semi-circular guide grooves corresponding to four grooves of the bearing main body, and having tongue pieces.

It is still another object of the present invention to provide a linear bearing unit in which the bearing main body may keep a desired contact angle and may easily apply a pre-load (predetermined pressure) by a circular cavity formed in the rectangular member, forming four parallel longitudinal track grooves in said cavity spaced apart at a desired angle on the same circumference and forming clearances at the desired positions of said ball track grooves even if some errors are found in the arrangement (indexing or centering) of the track grooves of the bearing main body and the track grooves. The invention as well as other objects and advantages thereof will become more apparent from the following detailed description when taken together with the accompanying drawings, in which:

DETAILED DESCRIPTION OF THE INVENTION

Figure 1:
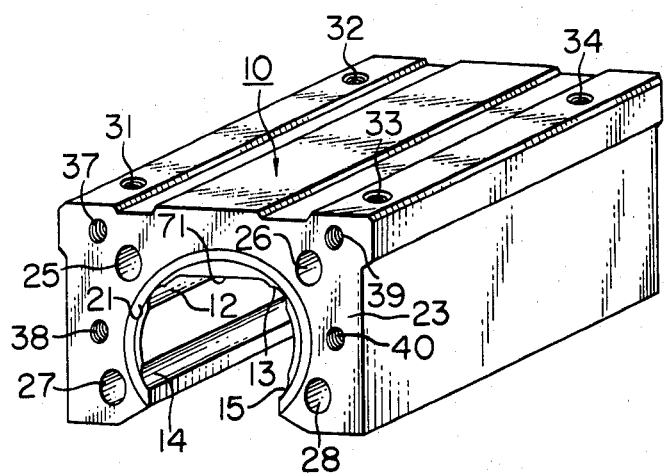
FIG. 1 is a perspective view of a bearing main body of a linear bearing unit of the present invention.
Figure 2:
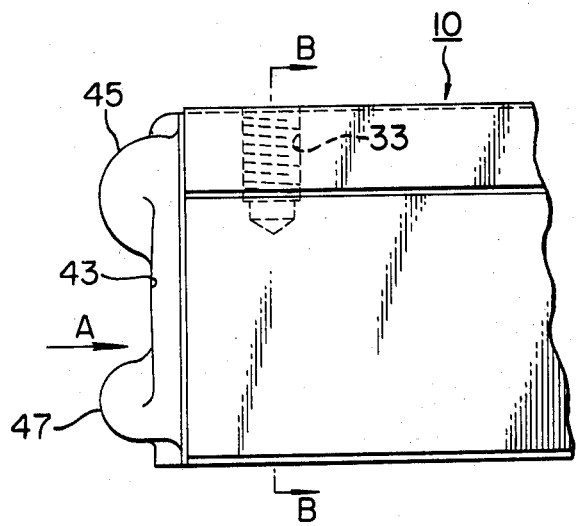
FIG. 2 is a side elevational view of a linear bearing unit of the present invention with a certain portion being eliminated.

Referring now to the drawings, a preferred embodiment of the present invention will now be described.

Reference numeral 10 shows a bearing main body.

The bearing main body 10 is formed by a rectangular shaped steel plate with a cut-out elongated central aperture having an inverted C-shape cross section formed by rough planar machining or made such that a cylindrical inner recess 11 is longitudinally formed at a substantial central part of the rectangular steel material, a flat surface 71 is formed at the top surface of the inner circumference of said inner recess 11, and further concave track grooves 12, 13, 14 and 15 having substantially the same radius of curvature as that of the balls in a radial direction from the inner circumference surface of said inner recess 11.

Track grooves 12 and 13 are formed at the upper left and right of flat surface 71. Track grooves 14 and 15 are formed below track grooves 12 and 13. These track grooves 12 to 15 are formed in such a manner that they are arranged at a position of 45° in respect to a horizontal line X—X through which the load balls pass a center $O_1$ of the bearing main body 10, and the lower left and right track grooves 14 and 15 are formed such that the load balls are arranged symmetrically at a position of 15° in respect to a horizontal line X—X.

The contact angle of the upper load balls with respect to the unit is 30° between a contact point with a track table 16 and a contact point of the bearing main body 10 with respect to a center of axis $O_2$, and the side (lower) load balls are positioned at 30° lower with respect to the center of axis $O_2$.

Reference numerals 17 and 18 show recesses which are made by longitudinally cutting in parallel with a vertical line Y—Y the outer side portions of the upper track grooves 12 and 13 of the bearing main body 10.

Reference numerals 19 and 20 also show recesses which are made by longitudinally cutting at an angle of 30° with respect to the vertical line Y—Y the upper side portions of the lower track grooves 14 and 15 of the bearing main body 10. Reference numerals 21 and 22 show annular projections for use in returning and guiding the balls which are formed at both end surfaces 23 and 24 of the bearing main body 10.

Reference numerals 25, 26, 27 and 28 show non-load ball holes defining a travel path formed longitudinally from the end surface 23 of the bearing main body 10, the upper right and left non-load ball holes are located on a line inclined at 45° with respect to a horizontal line X—X passing through a center $O_1$ of the bearing main body 10 and furtner positioned at a crossing point abutting against the outer circumference edges of said annular projections 21 and 22. The lower right and left non-load ball holes are located on a line inclined at 15° with respect to the horizontal line X—X passing through the center $O_1$ of the bearing main body 10 and positioned at a crossing point abutting against the outer circumferential edges of said annular projections 21 and 22.

Thereafter, open ends 29 and 30 are longitudinally formed at the portions held by the lower right and left ball track grooves 14 and 15 of the bearing main body 10 cut at 30° with respect to the vertical line Y—Y and a bottom horizontal line Z—Z of the bearing main body 10.

The top surface of the bearing main body 10 is formed with threaded recieving holes 31, 32, 33 and 34. Both end surfaces 23 and 24 are formed with the side cover connecting holes 37, 38, 39 and 40 for fixing the flat portions 35 and 36 of the side caps 41 and 42 by screws. Said side cap fixing holes are formed with inner threads by tapping.

Reference numerals 41 and 42 indicate side caps made of steel plate to be fixed at a front end surface 23 and a rear end surface 24 of the bearing main body 10. Inner surfaces of the side caps 41 and 42 are integrally formed with concave portions 43 corresponding to the annular projections 21 and 22 made in the front and rear end surfaces 23 and 24 of the bearing main body 10, with the U-shaped concave portions 44 to 47 for use in changing the direction of the balls which coincide with track grooves 12 to 15 of the bearing main body 10 and the non-load ball holes 26 to 28.

Reference numerals 48 to 51 indicate a semi-circular guide tongues formed in the side caps 41 and 42. These tongues are formed at the lower portions of the U-shaped concave portions 44 to 47 for use in changing the direction of the balls rolled in the track grooves 52 to 55 of the track table 16, i.e. a so-called linear direction, to a rotating direction in which the balls are guided into said direction changing U-shaped concave portions 44 to 47 for guiding them into the non-load ball holes of the bearing main body 10.

Reference numerals 35 and 36 indicate a flat portion of the side caps 41 and 42, respectively and some fixing holes 56 to 59 are formed at desired places on said flat portion.

Figure 3:
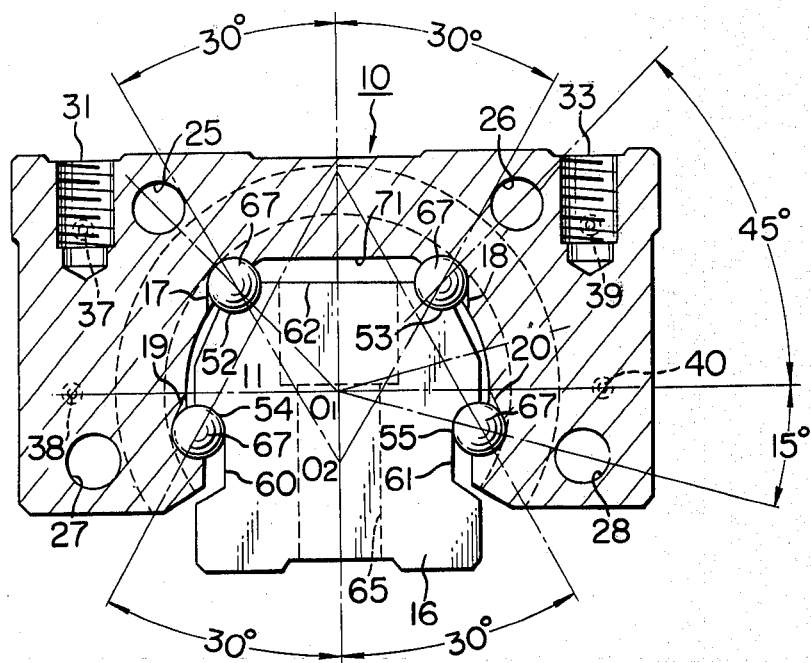
FIG. 3 is a front elevational view taken along a line B—B of FIG. 2 showing a condition in which a track member is inserted or fitted via balls.
Figure 4:
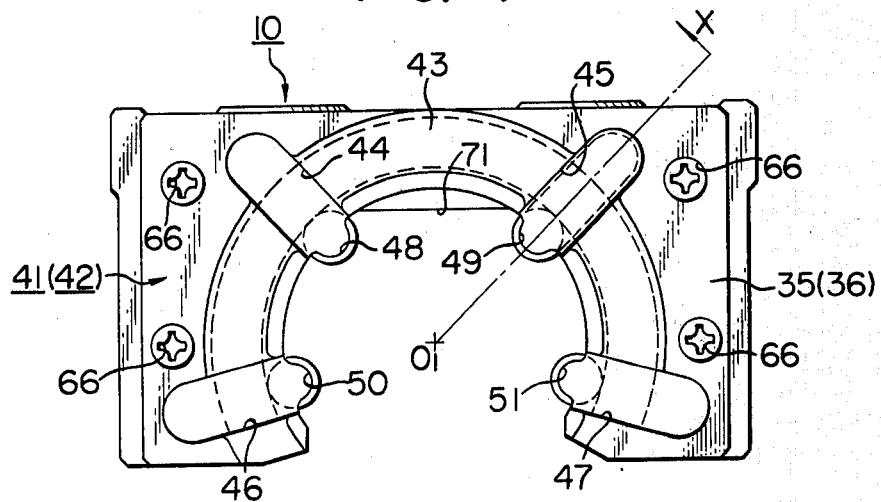
FIG. 4 is a front elevational view of a linear bearing unit of the present invention.
Figure 5:
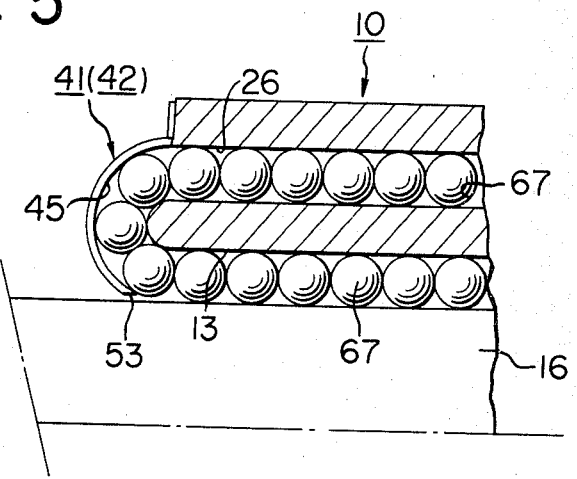
FIG. 5 is a sectional view taken along a line O-X of FIG. 4.
Figure 6:
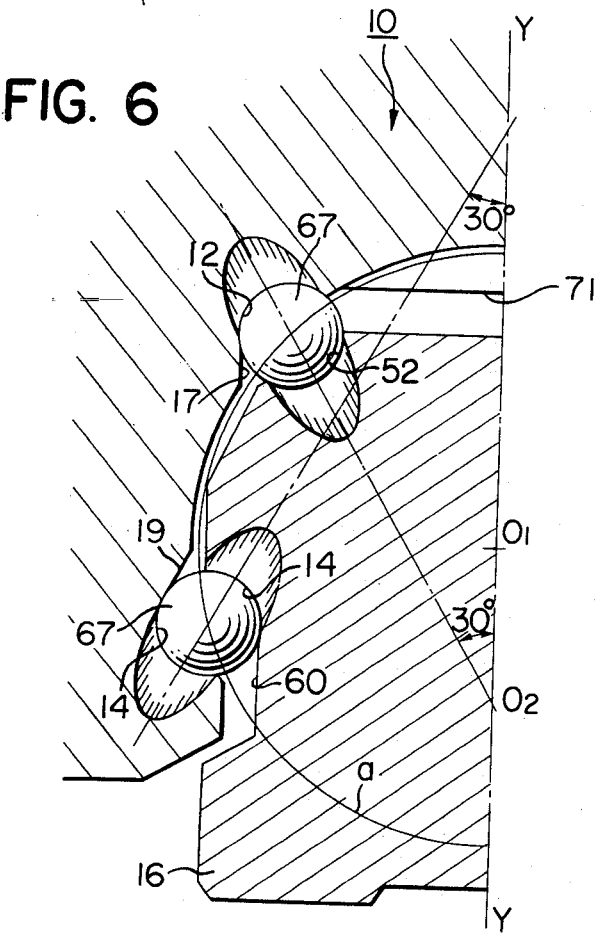
FIG. 6 is an enlarged illustration showing condition of contact between a bearing main body and some load supporting balls in the track channels of a track table.
Figure 7:
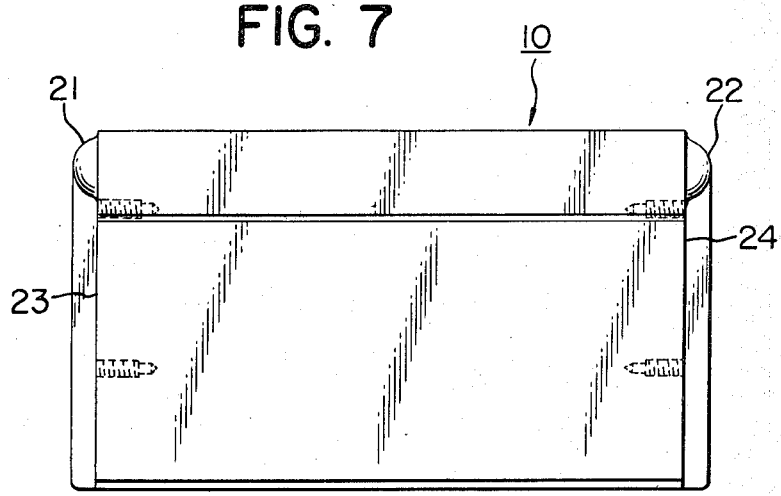
FIG. 7 is a side elevational view of the bearing main body.
Figure 8:
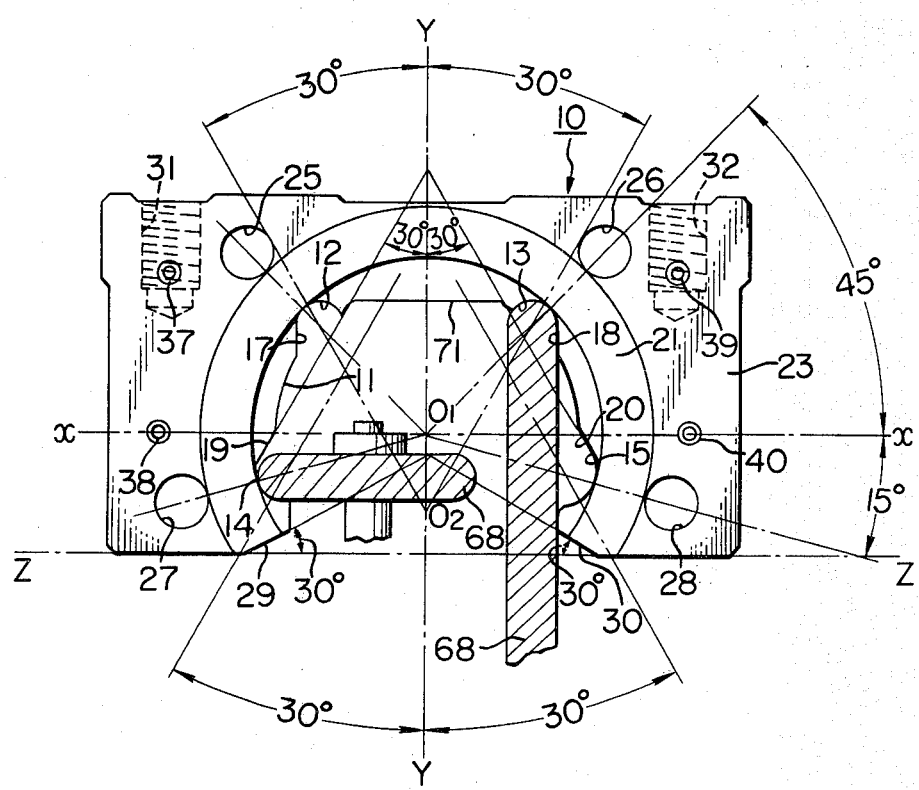
FIG. 8 is a front elevational view of the bearing main body.
Figure 9A:
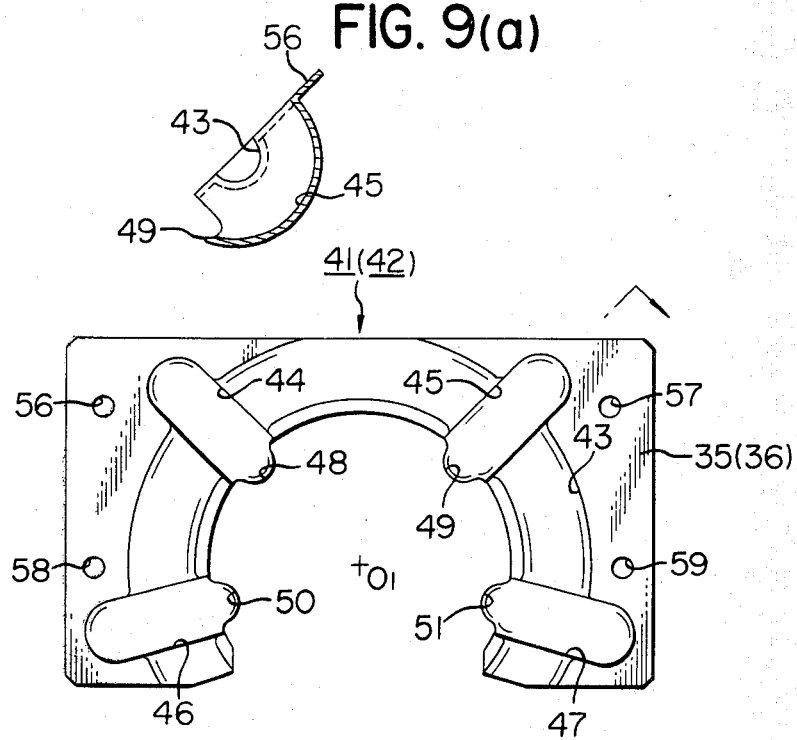
FIG. 9(a) is a front elevational view of a side cover and FIG. 9 (b) is a side elevational view of the side cover.
Figure 9B:
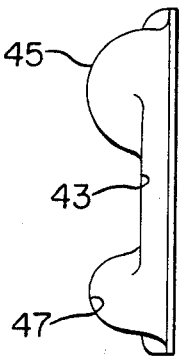
Figure 10:
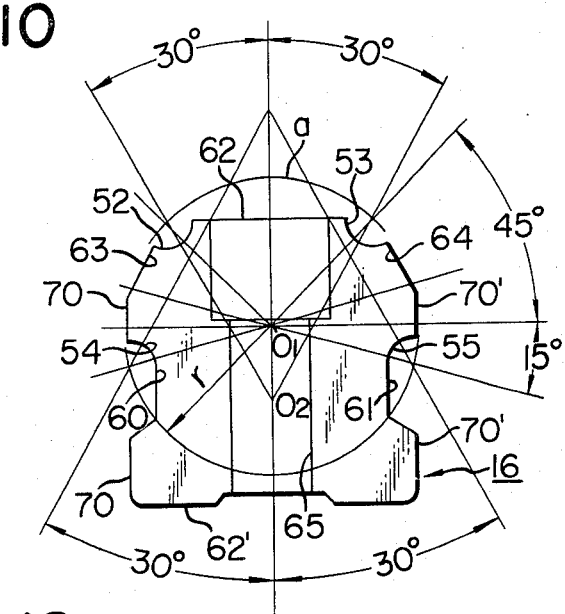
FIG. 10 is a front elevational view of a track table.
Figure 12:
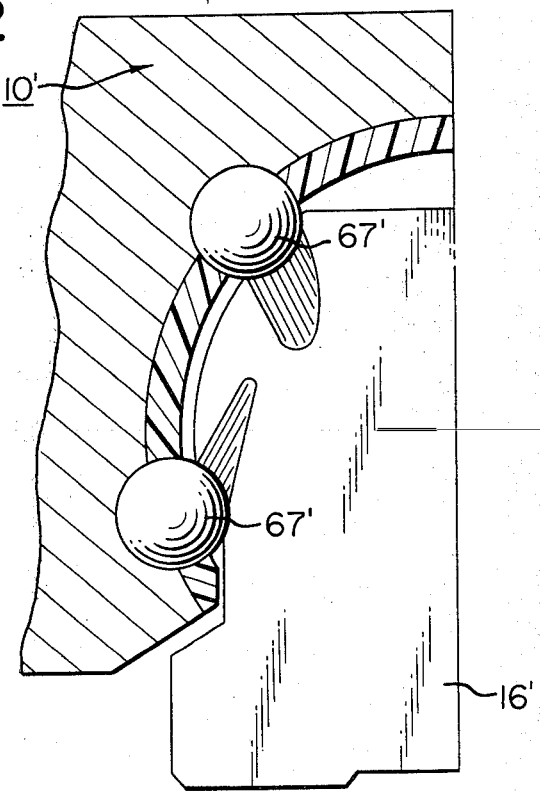
FIG. 12 shows an enlarged view for illustrating a well-known condition of a contact between the bearing main body in a linear bearing unit having a holder and the track channels in a track table.

Track table 16 (FIG. 3), which has track grooves 52 to 55 therein is formed of a member having a square section and the table is aligned with a center O of the bearing main body.

Thereafter, the upper and lower parallel surfaces 62, 62' and the right and left parallel surfaces 70, 70' are formed to show a machining reference plane. The upper right and left track grooves 52 and 53 are placed on a line inclined at 45° with respect to a horizontal line X—X passing through the center $O_1$ of the track table 16. The lower right and left track grooves 54 and 55 are placed on a line inclined at 15° with respect to the horizontal line X—X and are symmetrical. Further, concave track grooves 52 to 55 having substantially the same radius of curvature as that of the ball are formed or made with their centers being located at such a position as crossing with a pitch circle diameter (P.C.D.) $\alpha$ which is made to have a desired radius r with respect to said center $O_1$.

Then, the clearances 60 and 61 of the lower (side) right and left track grooves 54 and 55 are made by a tangential line contacting the track grooves 54 and 55 and formed axially in parallel with a vertical line.

Reference numeral 62 indicates a flat part of the track table 16, reference numerals 63 and 64 show two projections and reference numeral 65 illustrates a fixing hole.

Reference numeral 66 indicates screws (with Phillips heads) for use in fixing the side caps 41 and 42 to the end surfaces 23 and 24 of the bearing main body 10.

Reference numeral 67 indicates balls. Reference numeral 68 shows a grinder wheel which is applied for grinding four track surfaces.

Each of the component elements of the linear bearing unit of the present invention is constructed as herein described, and the order of assembling the component elements will now be described.

At first, the side cap 41 is attached to one end surface 23 of the bearing main body 10 with screws 66, then the track table 16 of a desired length is inserted into the inner cavity of said bearing main body 10. Under this condition, the balls 67 are charged in sequence in the non-load ball holes 25 to 28 in the other end surfaces 24, the spaces between the track grooves 12 to 15 of the bearing main body and the track grooves 52 to 55 of the track table, then the side cap 42 is attached to the other end with screws 66.

The operation of the linear bearing unit of the present invention will now be described.

When the linear bearing unit of the present invention is assembled in a machining tool (not shown), some required implements are set in the assembled unit and then the bearing unit is moved forward along with these implements, the load balls 67, 67, . . . which are held by the concave track grooves 52 to 55 of the track table 16 and by the concave track grooves 12 to 15 of the bearing main body 10 are moved along with the bearing main body 10, scopped up by the ball guide tongues 48 to 51 formed in the side caps, pushed up into the direction changing U-shaped concave portions 44 to 47, and then transferred smoothly into the non-load ball holes 25 to 28.

A point of contact of track table 16 are positioned on a line inclined at 30° with respect to a center of axis $O_2$, and also the lower load balls are positioned on the line inclined at 30° with respect to a center of axis $O_2$ and thereby both the upper and lower right and left load balls show the same unti-load characteristic.

Figure 11A:
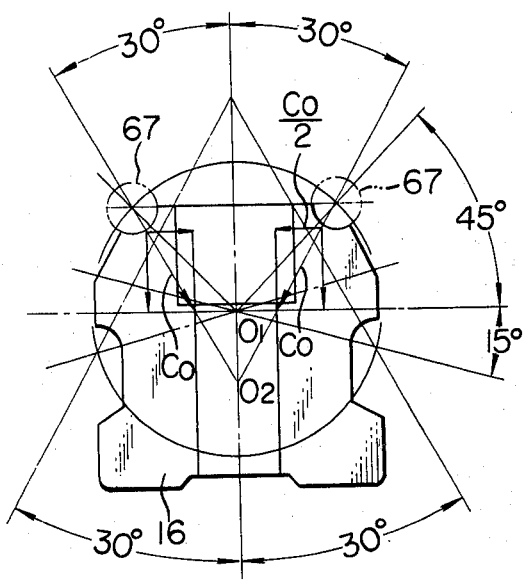
FIGS. 11(a) and (b) illustrate a relation of the antiload of some load balls in the track channels in the track table.
Figure 11B:
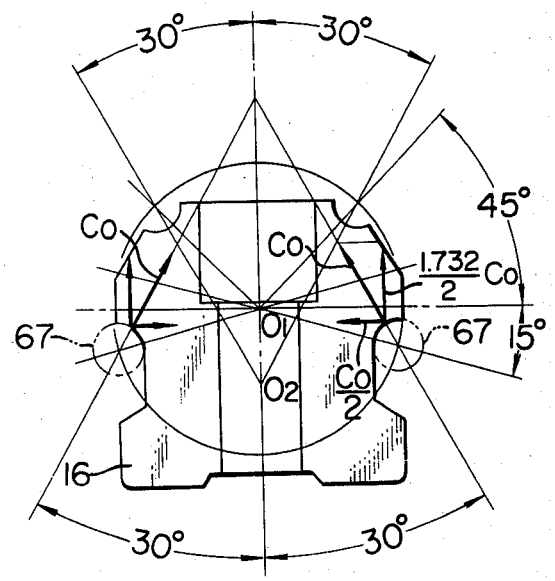

That is, as apparent from FIGS. 11(a) and (b), when the anti-load characteristic in a direction toward a contact angle is $C_o$, Anti-load in a downward direction:

$$1732\ C_o/2 \times 2 = 1732\ C_o$$

Anti-load in a rightward or leftward direction:

$$\frac{C_o}{1732/2}\ C_o \times 2 = 1732\ C_o$$

Thus, the upward and downward loads become equal to each other.

Clearances are formed in the upper track grooves of the bearing main body and the outside portions of the lower track grooves of the track table parallel to the line Y—Y, and clearances are also formed in the upper portions of the lower track grooves of the bearing main body at an angle of 30° with respect to the line Y—Y, so that each of the contact points is kept at a specified position and the contact angles of the opposing two load balls become parallel to each other.

Thus, it is possible to apply a pre-load to the load balls in the four rows of grooves under a condition in which a contact angle is maintained and further it is possible to extend the life of the linear bearing and increase its rigidity.

Since the present invention has no holder cage and also the concave grooves for load ball track in the bearing body and the track table show a deep groove near the center of the pitch circle (P.C.D) of the balls, an edge load (edge polar load) is not applied and a rational load distribution in the track grooves is realized and a life of the bearing may be extended.

Since the linear bearing of the present invention has no supporting cage, the number of parts is decreased and a cost of the bearing is also decreased. Increase or decrease of a length of the track surface (similar to the track grooves) of the linear bearing may be performed by changing only the length of the bearing main body, therefore several types of linear bearing units having a high load capacity to a low load capacity may readily be manufactured.

The track table forms the upper lower, right and left parallel surfaces, resulting in providing four track grooves.

What is claimed is:

1. A linear ball bearing unit, comprising in combination:
   a. an elongated bearing main body having front and rear end surfaces (23, 24);
   b. an elongated hollow center portion defined between said end surfaces, said center portion being defined from a cylindrical configuration but having a horizontal flat top inner surface (71), an open bottom, and curved sides symmetrically disposed around the center axis of said cylindrical configuration;
   c. two upper and two lower concave longitudinal parallel outer track grooves (12, 13, 14, 15) defined in said center portion, with loaded bearing balls (67) therein, said concave track grooves being adapted and disposed so as to provide the outer portion of a loaded travel path for said bearing balls, said concave track grooves having a radius of curvature substantially the same, but slightly larger as the bearing balls, the two upper track grooves (12, 13) being located on opposite sides of said horizontal flat top inner surface (71), the centerpoints defined by the radii of curvature of said two upper track grooves being located on a first set of theoretical radial lines making an angle of 45° with a theoretical horizontal diameter passing through the center axis of said center portion spherical configuration, and located above said theoretical horizontal diameter, the theoretical centers of the two lower track grooves (14, 15) being similarly located on a second set of theoretical radial lines marking an angle of 15° with said theoretical horizontal diameter, but located below said horizontal diameter;
   d. an elongated track table (16) disposed in said center portion havig two upper and two lower inner grooves for tracks (52, 53, 54, 55) defined therein corresponding to the outer track grooves so as to hold said bearing balls (67) therein, said track table having a theoretical cross-sectional configuration axially aligned with said hollow center portion, with a flat upper surface (62) disposed opposite said flat top inner surface (71), said inner grooves for tracks having a radius of curvature corresponding to that of the outer track grooves, the centerpoints of the radii of curvature of said two upper inner grooves being located on said first set of radial lines while the centerpoints of the radii of curvature of said two lower inner grooves being located on said second set of radial lines, said inner track grooves providing the inner portion of a loaded travel path for loaded balls in cooperation with the corresponding outer portion of a loaded travel path definedfor providing a non-loaded return travel path for the bearing balls, each of said non-loaded travel paths being adjacent to an outer track groove, each of said non-loaded travel paths having a radius of curvature substantially the same but slightly larger than that of the bearing balls and having centerpoints located on said first and second theoretical radial lines and each being equally spaced from its adjacent outer track groove as the other non-loaded travel paths;
   f. caps (44, 45, 46, 47) disposed over the front and rear ends of said bearing main body connecting the defined loaded travel paths with the non-loaded travel paths, each cap having a U-shaped portion so that the bearing balls can pass between the loaded and non-loaded travel paths; and,
   g. semi-circular guide tongues (48, 49, 50, 51) defined in the caps to charge direction of travel of the rolling bearing balls (67).

2. A linear ball bearing unit as claimed in claim 1 wherein the spherical center of a bearing ball in one of the travel paths defined by a pair of upper outer and inner grooves will lie on a theoretical line which is at an angle of 30° with respect to a theoretical line which is at right angles to said theoretical horizontal diameter and passes through the center axis of said center portion spherical configuration.

* * * * *